United States Patent [19]
Peter

[11] Patent Number: 5,773,964
[45] Date of Patent: Jun. 30, 1998

[54] OUTPUT AND TORQUE CONTROL OF AN AUTOMOTIVE ALTERNATOR

[75] Inventor: David Allan Peter, Anderson, Ind.

[73] Assignee: General Motors Corporation, Detroit, Mich.

[21] Appl. No.: 636,195

[22] Filed: Apr. 22, 1996

Related U.S. Application Data

[63] Continuation of Ser. No. 357,908, Dec. 16, 1994.

[51] Int. Cl.$^6$ .................................................. H02P 9/00
[52] U.S. Cl. ........................... 322/20; 322/29; 322/32; 307/73; 318/606
[58] Field of Search .................................. 322/20, 25, 27, 322/28, 29, 32; 307/73; 318/606

[56] References Cited

U.S. PATENT DOCUMENTS

| | | | |
|---|---|---|---|
| 4,143,280 | 3/1979 | Kuehn, Jr. et al. | 290/9 |
| 4,356,440 | 10/1982 | Curtiss et al. | 323/210 |
| 4,477,765 | 10/1984 | Glennon et al. | 322/20 |
| 4,479,082 | 10/1984 | Schauder et al. | 318/799 |
| 4,496,897 | 1/1985 | Unnewehr et al. | 322/25 |
| 4,701,692 | 10/1987 | Takeuchi et al. | 322/90 |
| 4,767,976 | 8/1988 | Mutoh et al. | 318/308 |
| 4,771,224 | 9/1988 | Elms | 318/809 |
| 4,788,485 | 11/1988 | Kawagishi et al. | 318/811 |
| 4,912,378 | 3/1990 | Vukosavic | 318/254 |
| 5,038,092 | 8/1991 | Asano et al. | 318/811 |
| 5,083,039 | 1/1992 | Richardson et al. | 290/44 |
| 5,124,626 | 6/1992 | Thoen | 318/610 |
| 5,144,178 | 9/1992 | Sugiura | 310/114 |
| 5,231,344 | 7/1993 | Marumoto et al. | 322/14 |
| 5,250,890 | 10/1993 | Tanamachi et al. | 318/811 |
| 5,255,175 | 10/1993 | Uchino | 363/81 |
| 5,266,836 | 11/1993 | Sousa | 290/31 |
| 5,285,144 | 2/1994 | Hsu et al. | 318/807 |
| 5,325,042 | 6/1994 | Murugan | 322/10 |
| 5,408,067 | 4/1995 | Crouse | 219/137 |

FOREIGN PATENT DOCUMENTS

| | | |
|---|---|---|
| 0545454 | 6/1993 | European Pat. Off. . |
| 0 665 637 | 1/1995 | European Pat. Off. . |
| 3432128 A1 | 3/1985 | Germany . |
| 4007350 A1 | 9/1990 | Germany . |
| 4138030 | 5/1992 | Japan . |

*Primary Examiner*—Steven L. Stephan
*Assistant Examiner*—Nicholas Ponomarenko
*Attorney, Agent, or Firm*—Vincent A. Cichosz

[57] ABSTRACT

An apparatus for controlling the output and torque of a synchronous alternator has a controlled bridge rectifier operable off synchronous for rectifying the alternating output and establishing a desired phase relationship between the alternating voltage and alternating current of the output winding. Phase locked loop control may be employed for establishing and maintaining a desired phase relationship to control the output and torque.

5 Claims, 4 Drawing Sheets

5,773,964

OUTPUT AND TORQUE CONTROL OF AN AUTOMOTIVE ALTERNATOR

This is a continuation of application Ser. No. 08/357,908 filed on 16 Dec. 1994.

BACKGROUND OF THE INVENTION

This invention relates to an apparatus and control of an automotive alternator. More specifically, an apparatus and control for an engine driven alternator is disclosed which selectively increases or decreases the power output thereof and increases or decreases the torque load presented thereby to the vehicle engine.

Conventional motor vehicle electrical systems include an alternator having a field winding, a three phase stator winding and a full wave diode bridge rectifier for converting the polyphase AC output of the windings to a DC output voltage for supplying various vehicle loads, including the vehicle battery. In addition, a voltage regulator associated with the alternator is effective to control the current supplied to the field winding to thereby control the DC output voltage to a desired value.

The power capacity of the alternator is limited by such factors as physical machine size and field current limitations. Increasing machine size is undesirable for reasons of increased vehicle mass and volume as well as unacceptably high inertias upon the vehicle engine and accessory drive system.

Several methods of reducing alternator torque during heavy engine acceleration are well known but are typically constrained by the rate at which field current, and thus rotor field and resultant torque, is able to decay. Given that the decay rate is a function of the substantially inductive characteristics of the field coil, this time can be substantial with respect to the desired torque response time.

SUMMARY OF THE INVENTION

Therefore, it is an object of the present invention to maximize the capacity of an automotive alternator.

A further object is to accomplish increased output in a machine having conventional mass and volume.

These and other objects are advantageously provided for by the invention as described hereinafter in detail wherein a vehicle electrical system is comprised of a polyphase alternator driven by the vehicle engine for supplying electrical loads including the vehicle battery. Each phase of the polyphase winding is coupled to a controlled bridge rectifier which is operated in a first mode to provide synchronous rectification of the AC voltages of all phases. A second mode of operation operates the controlled bridge rectifier off synchronous through a retard or advance of the conductive states of the bridge elements. Control of the advance and retard of the conductive states simulates a reactive load to the AC outputs and thereby effects the phase relationship of the current and voltage to bring about the desired increased output (increased torque load) or decreased torque load (decreased output).

In accordance with a preferred embodiment, a microcomputer controls the phase relationship by supplying an additive offset command to a current/voltage phase locked loop effective to increase or decrease the phase difference between the current and voltage by controlling the conduction timing of the controlled rectifier elements.

DETAILED DESCRIPTION OF THE INVENTION

Figure 1:
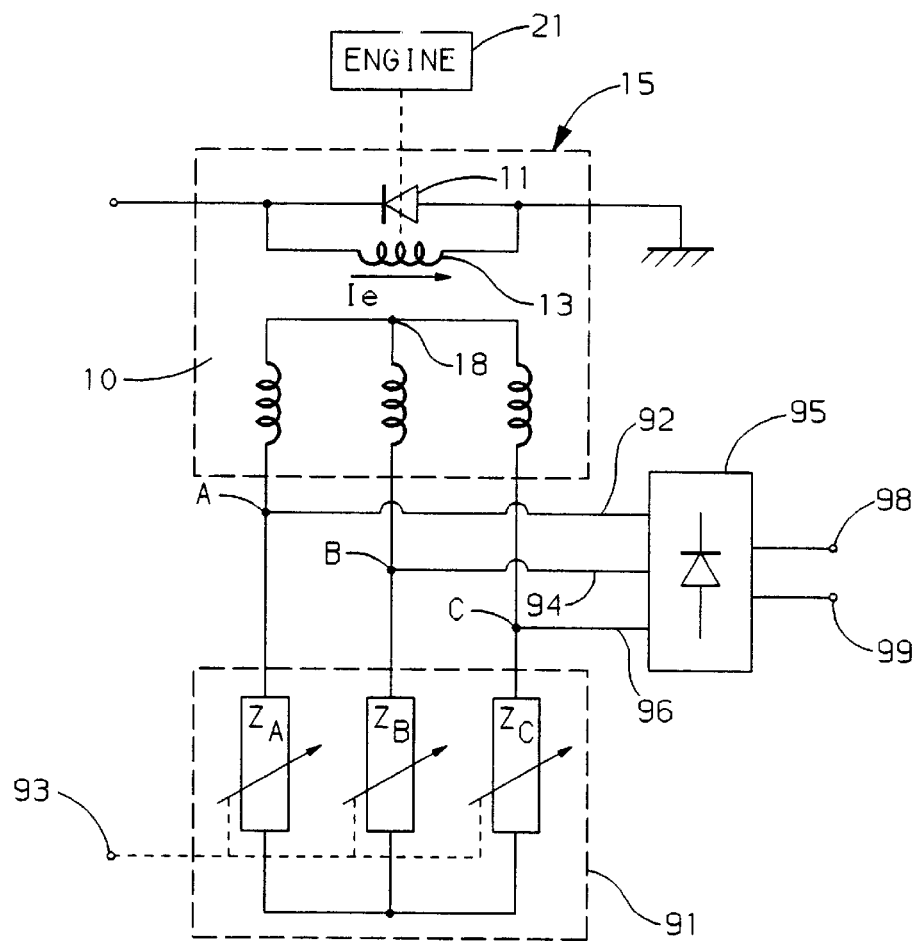
FIG. 1 illustrates functionally an apparatus in accordance with the present invention.

Referring first to FIG. 1, the reference numeral 15 designates a synchronous alternator that has a rotor and a three phase Y-connected output for stator winding 10. The rotor is driven at a variable speed by an engine 21 on a motor vehicle. The rotor comprises field coil 13 and suppression diode 11. A field excitation current Ie is provided to establish the magnetization of the rotor. As the rotor rotates an alternating voltage is induced or generated in output winding 10. The frequency of the alternating voltage generated in winding 10 is directly proportional to the speed of rotation of the rotor. Further, the magnitude or amplitude of this voltage is a function of rotor speed and field excitation current. Field excitation current is controlled by any one of a number of well known alternatives for maintaining the output voltage of the alternator at a desired value, for example 14 volts. Output winding 10 has a neutral 18 and is comprised of three phase windings each having an output A, B or C.

Conventionally, the outputs A, B and C solely are coupled directly to input terminals 92, 94 and 96 of a bridge rectifier 95 for converting the three phase alternating voltage output to a direct voltage output between a pair of output terminals 98, 99. As such, the electrical load presented to the alternator 15 may be considered to be purely resistive.

The output voltage versus output current relationship of a synchronous machine can be modeled as an open circuit voltage in series with an impedance which is typically inductive. This impedance is typically referred to as the synchronous impedance. This gives a finite short circuit output which is dependent on this impedance and the open circuit voltage.

Figure 3A:
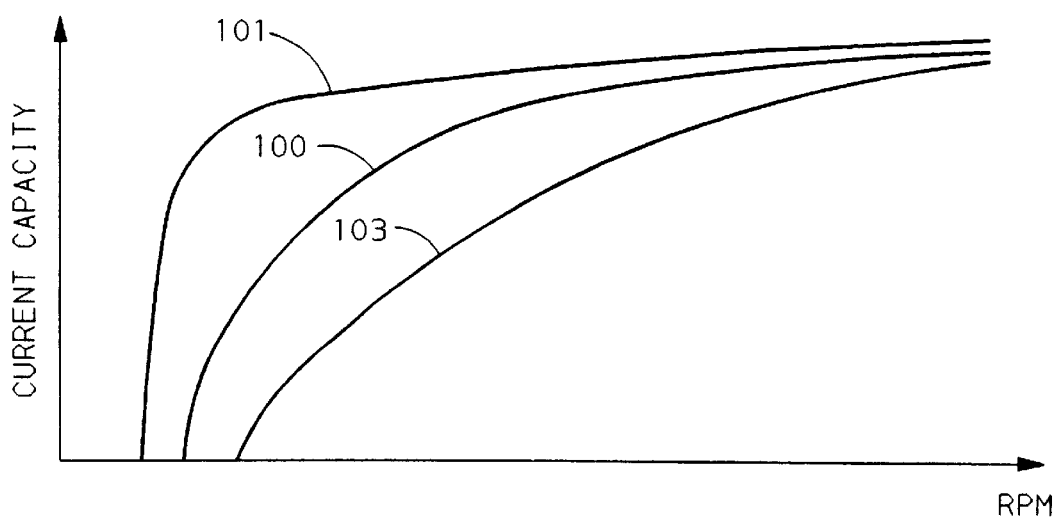
FIG. 3A illustrates generally the relationship between current delivery capacity and alternator rotational speed for various loads applied to an alternator in accordance with the present invention.
Figure 3B:
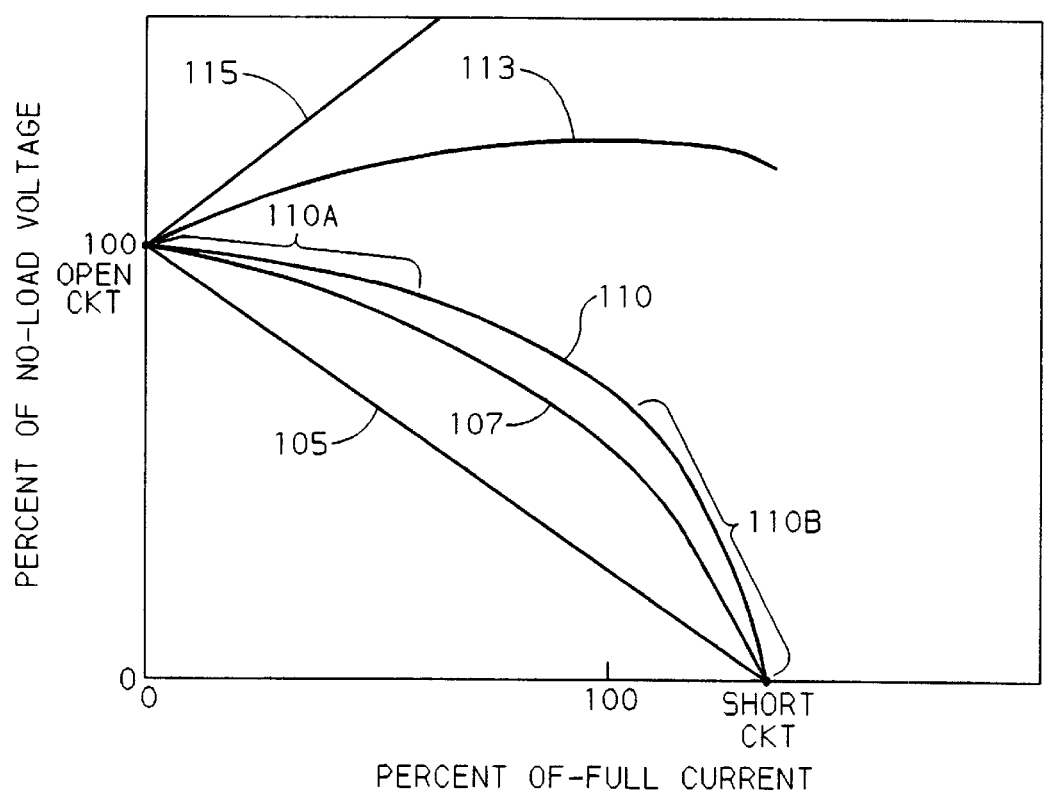
FIG. 3B illustrates generally the output characteristics of a synchronous alternator under different load conditions.

The graph of FIG. 3B illustrates the output characteristics of a synchronous alternator for various types of loads presented thereto. Percent of no-load alternator voltage is presented along the vertical axis and percent of full-load alternator current is presented along the horizontal axis. For purely resistive loads presented to the alternator, the output follows curve 110 between open circuit and short circuit conditions or, put another way, between infinite and zero resistance. When the resistive load dominates the synchronous impedance (i.e. high resistance), the output is relatively voltage constant as seen in the portion of curve 110 labeled 110A. However, when the synchronous impedance dominates the resistive load (i.e. low resistance), the output is relatively current constant as seen in the portion of curve 110 labeled 110B. The automotive Lundell machine is typically designed with substantial synchronous impedance to thereby dominate the resistance and to operate nearer the short circuit point. Such a machine is thereby inherently substantially current self limiting.

Because of the presence of the synchronous impedance, not only does the resistive portion of the load affect a synchronous machine's output, the reactive portion of the load also can significantly effect the output. This can be seen in FIG. 3B as well. For purely inductive loads presented to the alternator, the output follows curve 105 between open circuit and short circuit conditions. For a complex resistive/inductive load presented to the alternator, the output follows a curve between curves 105 and 110, for example curve 107. Increasingly inductive loads contribute to the inductance of the synchronous impedance of the alternator and reduces output. Similarly, for purely capacitive loads presented to the alternator, the output follows curve 115 between open circuit and short circuit conditions. For a complex resistive/capacitive load presented to the alternator, the output follows a curve between curves 115 and 110, for example curve 113. Increasingly capacitive loads tends to cancel the inductive effects of the synchronous impedance of the alternator and increases output.

Figure 3C:
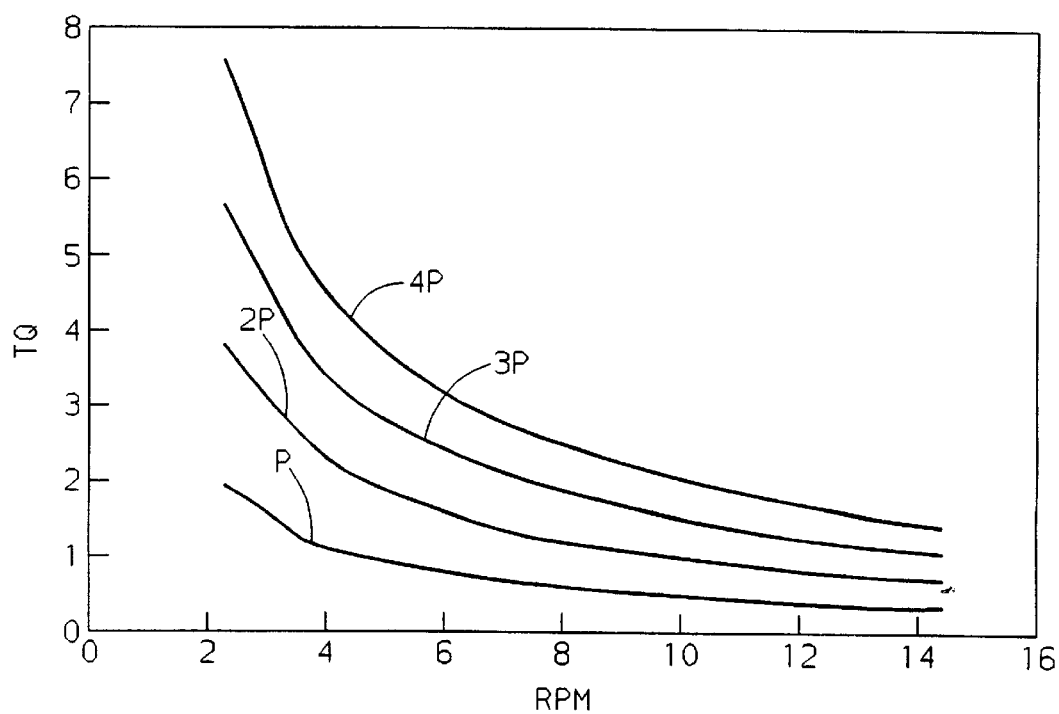
FIG. 3C illustrates generally the input torque characteristics for various power output conditions of a synchronous alternator.

Since the machine output can be controlled by changing the reactance of the load, it follows that the input to the machine can be changed with the same mechanism. FIG. 3C shows the relationship of alternator speed and input torque for different alternator power outputs all at a constant machine efficiency. The input torque "TQ", that is the torque load on the accessory drive system which drivingly couples the engine to the alternator, is presented in arbitrary unit multiples along the vertical axis and alternator speed "RPM" is presented in arbitrary unit multiples along the horizontal axis. Both horizontal and vertical axes are scaled linearly. Four curves are plotted representing whole number multiples of a unit power output "P" and are accordingly labeled. As can be seen, an output power reduction results in a substantially proportional input torque reduction. Since reactances themselves do not dissipate energy, changing the reactances presented to the alternator output changes the input torque in accordance with the change in the output power. Changing the reactance of the load electronically as outlined herein is much quicker than changing the field current in a typical automotive alternator because of the typically large inductance of the field coil. If quick changes in power output or input are desired, this becomes an attractive method because of its speed and efficiency. Since high engine accelerations are a problem in driving high inertia loads (such as an automotive alternator) through a belt, this feature can help mitigate alternator torque loads presented to the belt under such conditions. Additionally, since power is not dissipated in the reactive portions of the load, the control of the present invention is even more attractive.

Heretofore, the load(s) presented to the AC outputs of an automotive alternator have been resistive thereby resulting in current/voltage phase conformity. In fact, actual vehicle loads which are the consumers of power generated by the alternator are predominantly DC loads. In any case, vehicle loads are isolated from the AC outputs of the alternator by the rectifier bridge thereby negating any reactive interaction of the alternator with vehicle loads.

In accordance with the present invention, coupled to AC output terminal A, B and C are bridge rectifier 95 and variable reactance 91 illustrated as individual reactive loads ZA, ZB and ZC in Y-configuration. The reactive values of ZA, ZB and ZC are preferably equivalent so as to present a balanced load to the output winding 10. Reactance values ZA, ZB and ZC are controllable in accordance with a signal on line 93.

It can now be appreciated that the ends of the phase windings A, B and C being coupled to balanced reactive load 91 and bridge rectifier 95 introduces to the AC output side of the machine a complex impedance having both reactive and resistive components. The complex nature of the load presented to the output winding 10 therefore can result in a current/voltage phase difference from 90 degrees leading to 90 degrees lagging. Bridge rectifier 95 as illustrated in the model of FIG. 1 may take the form of a conventional diode bridge rectifier or other well known conventional rectification means such as controlled synchronous rectifiers.

Turning now to FIG. 3A, general relationships of current capacity "I" of a conventional automotive alternator presented with loads of differing reactive content are plotted against rotational speed of the alternator "RPM". Each axis is presented linearly but without units to demonstrate the general differences in output characteristics. Each curve corresponds to loads of differing reactive content as seen by the AC side of the alternator. Curve 100 typifies the current capacity characteristics of an alternator presented with a purely resistive load across the AC output. This curve corresponds substantially to conventional automotive systems having a diode bridge rectifier coupled directly to the AC outputs of the machine for supplying the vehicle DC loads and AC isolating the loads thereby. Curve 101 typifies the current capacity characteristics of an alternator presented with a complex load across the AC output, and more specifically a load resulting in leading stator currents. Partially capacitive impedances would result in such a curve. As previously mentioned, this type of reactive load results in cancellation of the synchronous reactance and increased output. Curve 103 also typifies the current capacity characteristics of an alternator presented with a complex load across the AC output, however in contrast, this load results in lagging stator currents. Partially inductive impedances would result in such a curve due to the additive effects of inductive portion of the load upon the synchronous reactance. The torque, which opposes rotation, follows similarly shaped curves where the vertical current capacity axis is replaced with a vertical torque axis.

Figure 2:
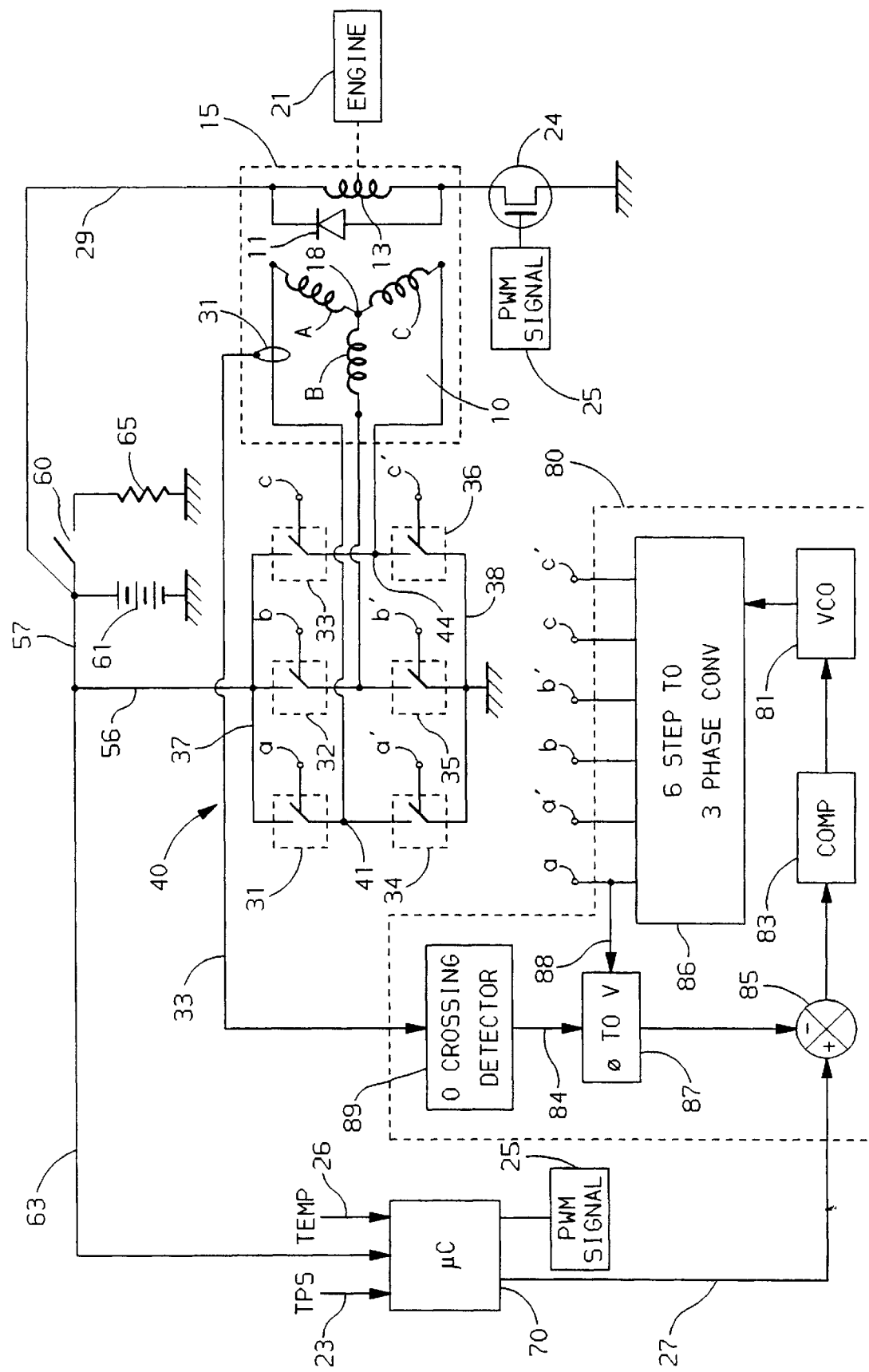
FIG. 2 illustrates schematically a preferred embodiment of an apparatus in accordance with the present invention.

Referring to FIG. 2, an apparatus is illustrated for carrying out the functions of the present invention. It is to be understood that numerals used to identify features in FIG. 2 which have been used in reference to other Figures herein identify like features. A vehicle electrical system has a storage battery 61 with its positive side connected to conductor 56 via conductor 57 and its negative side connected to ground. The battery 61 may be a 12 volt motor vehicle storage battery. Battery 61 further feeds various other motor vehicle electrical loads 65 on the vehicle. A switch 60 is illustrated for controlling the energization of vehicle electrical loads 65. Additionally, conductor 29 supplies current to field coil 13. Alternator 15 has a three phase Y-connected stator winding 10 and corresponding three-phase outputs A, B and C. Field excitation current is shown in the present embodiment to be controlled in accordance with pulse width modulated (PWM) field effect transistor 24 which receives a PWM signal 25 from controller 70 in accordance with the program instructions executed thereby for controlling the excitation current. Controller 70 monitors the system voltage via line 63 and provides an appropriate PWM signal to maintain system voltage at a desired level, typically 14 volts in a 12 volt automotive system. Controller 70 further monitors engine throttle position sensor TPS on line 23 to determine desirability of reducing the torque load upon the engine as described at a later point herein. Additionally, a temperature input Temp is labeled 26 and represents a measure of battery temperature or other temperature correlated thereto.

The three phase full wave bridge rectifier 40 of this system is comprised of six controlled rectifiers 31–36 illustrated schematically as switches. Bridge rectifier 40 has alternating current input terminals 41, 42 and 44 coupled to output windings A, B and C respectively. In a preferred embodiment, each of the controlled rectifiers comprise a field effect transistor (FET) which, when a gate voltage is applied thereto, places the FET into a bi-directional conducting mode for so long as the gate voltage remains applied. Conductor 37 forms the positive direct voltage output line for bridge rectifier 40 whereas conductor 38 forms the negative direct voltage output line for bridge rectifier 40.

Each of the controlled rectifiers 31–36 has associated therewith a control terminal responsive to a conduction signal to enable and disable conduction of the respective controlled rectifier. Each terminal corresponds to the gate of a respective FET in the present embodiment with the labelling convention of lower case a, b and c, and a', b' and c'. These gate labels correspond to like labels of drive terminal shown extending from converter 86 of phase locked loop control 80. The lower case and primed lower case convention is indicative of the relative logic states of such labeled gates. For example, where "a" is high and controlled rectifier 31 is conductive, "a'" is low and controlled rectifier 34 is non-conductive. Upper and lower controlled rectifier pairs (31,34; 32,35; 33,36) are never simultaneously conductive for such a condition would undesirably short circuit battery 61 positive terminal to ground.

Phase locked loop (PLL) 80 control is provided for controlling the conduction state and timing of the controlled rectifiers 31–36 comprising bridge rectifier 40 in accordance with program instructions executed by controller 70. PLL is effective to maintain a desired phase difference between the polyphase winding current and voltage throughout the range of operating speeds of the rotor. PLL 80 comprises well known six step to three phase converter 86 for generating symmetrical conduction signals. These conduction signals correspond to the drive terminals of converter 86 and gates of rectifier 40 elements and will commonly be referred to herein with the same alphabetic designations a, b and c and primed derivatives thereof. These signals have frequency and phase separation characteristics equivalent to those of the polyphase alternating voltage. In other terms more germane to the present three phase embodiment, the frequency of each conduction signal is equivalent to any one phase voltage of the polyphase alternating voltage and the conduction signals a, b and c are phase separated by 120 electrical degrees. Each conduction signal output therefrom is substantially a square wave form appropriately conditioned for driving the gate on a corresponding controlled rectifier. The frequency of each conduction signal as mentioned is controlled to the frequency of the polyphase alternating voltage generated in the output winding of the alternator and is symmetrical therewith. That is to say, each conduction signal is high for one-half the period and low for one-half the period. Converter 86 is responsive to an input from voltage controlled oscillator (VCO) 81 which is driven to oscillate at a frequency six times that of any phase voltage, thereby providing converter 86 an appropriate frequency input thereto for generating the three conduction signals a, b and c. In addition to the three conduction signals a, b and c, inverted conduction signals a', b' and c' are generated by converter 86 for a total of six outputs therefrom. These inverted conduction signals are likewise conditioned in the same appropriate manner as the non-inverted signals. Converter 86, including conduction signal conditioning therein, is not detailed herein as such converters are generally well known to those skilled in the art; however, such a converter typically inclues a six count counter and encoder and may include such signal conditioners as charge pumps where, as in the present embodiment, the controlled rectifiers comprise FETs.

Phase locked loop 80 further comprises a single phase current sense 31 and input thereof on line 33. The current sense input 33 is processed to detect the alternating current zero crossing point and essentially square up the waveform at 0 crossing detector 89 to establish a current phase signal on line 84. A same phase alternating voltage sense input on line 88 is taken from the appropriate conduction signal output of converter 86 as a matter of circuital efficiency although separate alternating voltage sensing means may provide this input. This signal is already squared up and provides the necessary alternating voltage phase information without further conditioning. The current phase signal 84 and voltage phase signal 88 are thereafter compared in phase and a phase difference signal produced therefrom. The present embodiment generates a voltage proportional to the phase difference therebetween by way of phase to voltage converter 87. This voltage is then summed at error node 85 with the voltage on line 27 which represents the desired phase difference as established in accordance with the program instructions executed by controller. The output from error node 85, the phase error signal, is input to a conventional compensation network to provide the desired degree of loop stability such as by conventional integral and/or amplification processing thereof. The output of compensation network establishes the voltage input to VCO 81 thereby completing the PLL.

It can now be appreciated that by controlling the conduction timing of the controlled rectifiers relative the polyphase alternating voltage, the effective load presented to the AC output winding can simulate various degrees of reactance as modeled in FIG. 1. The conduction timing of the controlled rectifiers as used herein means the point in the polyphase alternating voltage cycle whereat the conduction signals are applied. The reference utilized for this purpose are the zero crossing points of the polyphase alternating voltage. Where the controlled rectifiers are synchronously controlled, that is to say where conduction signals coincide with zero crossings of the respective alternating voltage phases, the load presented to the AC output winding is resistive and the current is in phase with the voltage. If, however, the conduction timing is altered, through advance or retard of the conduction signals a, b and c and corresponding inverted signals a', b' and c' relative the zero crossing, then bridge rectifier 40 simulates a partially reactive load by sourcing voltage back to the AC output winding in a fashion analogous to that of either a capacitive or inductive load. As previously described, such loads presented to the AC output winding will effect the output of the machine and hence its torque, allowing the control thereof by control of the conduction timing of bridge rectifier 40. PLL 80 will control the conduction timing of bridge rectifier 40 to establish and maintain the desired current/voltage phase according to desired phase signal 27.

In a preferred manner of operation of the system as set forth in FIG. 2, the present invention performs voltage regulation through control of the field current. So long as the output capacity of the alternator is sufficient to supply the active vehicle loads, including the vehicle battery, PWM signal 25 will be altered to control the field current necessary to maintain system voltage at a predetermined level, typically 14 volts. At the expense of some repetition, this is accomplished by controller 70 monitoring the system voltage at line 63 and periodically incrementally adjusting the PWM signal to establish and maintain the system voltage at 14 volts. When the PWM signal reaches a limiting value such that further increases in field current are not feasible, for example a duty cycle of 100 percent, phase control may be implemented to further increase the output of the alternator. To increase the output, it is desirable that the current lead the voltage and an appropriate desired phase signal on line 27 is generated by control 70. In practice, this control signal is periodically incrementally adjusted.

Figure 4:
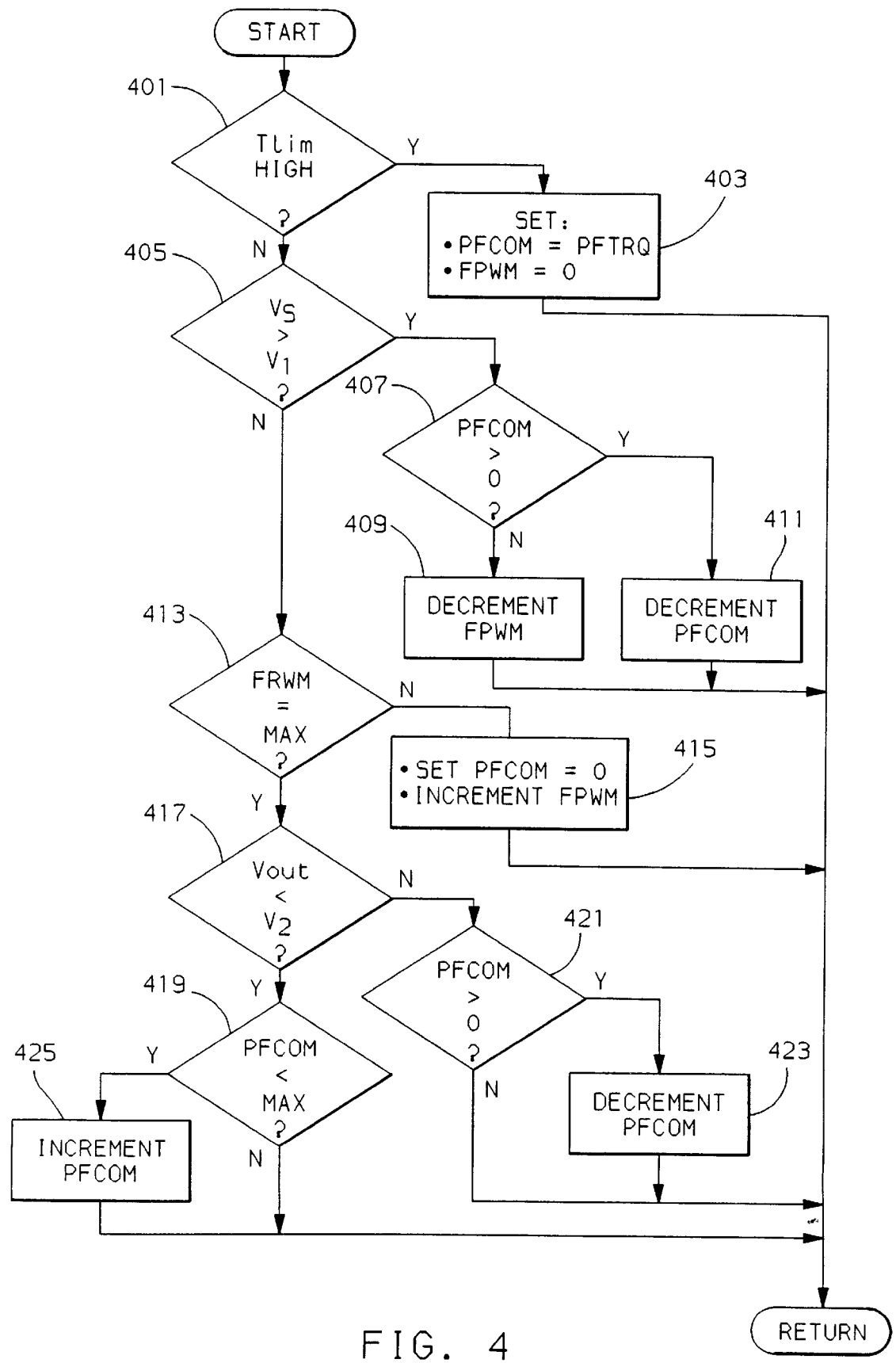
FIG. 4 illustrates a flow diagram representative of steps performed by the micro-controller of FIG. 2 in carrying out the functions of the present invention.

A flow chart representing groups of program steps executed by controller 70 is illustrated in FIG. 4. Controller 70 is preferably a microcomputer having ROM, RAM, I/O with A/D conversion, internal clock and CPU. It may be dedicated solely to performing the functions as herein described or it may execute the program steps as described herein as part of a much larger set of instructions for performing other vehicle control functions, for example engine and transmission controls.

At predetermined intervals a set of instructions beginning with block 401 is executed. At block 401, the desirability of torque reduction is determined in accordance with certain predetermined vehicle operating parameters. A two state variable or flag "Tlim" is checked to see if it is high or set thus indicating the desirability of an immediate reduction in the torque load on the vehicle engine presented by the alternator. For example, one such operating parameter might be the rate of positive throttle position change as conventionally calculated for various engine control functions. That is to say, a large rate of change in the throttle application may indicate the operator's desire for heavy vehicle acceleration. By reducing the torque load of the alternator upon the engine during acceleration, vehicle acceleration performance can be enhanced and the likelihood of accessory drive belt slip minimized. The present invention substantially immediately results in torque reductions when commanded whereas known alternatives such as reducing field current have unacceptably excessive response times associated with the decay characteristics of the field current. The present invention does not suffer the same delay limitations associated with field current decay. Assuming an immediate torque reduction is desirable, block 401 is answered affirmatively and program steps represented by block 403 are executed. Here, the desired phase signal "PFCOM" is set to a predetermined value "PFTRQ". PFTRQ is likely to be a value representing a current/voltage phase difference between zero and 90 degrees lagging. Additionally, the PWM signal "FPWM" is also set to a predetermined value, in the present embodiment zero. While the combination of reductions in both PFCOM and FPWM signals are stepped down to desired values in the present example, it is to be understood that other reduction schemes and combinations, for example controlled rate reductions, are fully contemplated. At this point, the routine is exited.

Alternatively assuming an immediate torque reduction is not desirable, block 401 is answered negatively and program steps represented by block 405 are executed whereat system voltage "Vs" is compared to a first predetermined voltage regulation setpoint "V1" above which an excessive system voltage is indicated. V1 may of course be indexed or offset in accordance with well known battery temperature dependant charge acceptance characteristics. Where Vs exceeds V1, block 407 is encountered and a check is performed on the desired phase signal PFCOM. Where the signal is positive, the PLL is functioning to establish leading currents which promotes higher voltages. PFCOM will have only been established positive where maximum field current as established by FPWM proved inadequate to control system voltage to the desired setpoint V1 as will be apparent in the description of steps 413–425. Leading currents (PFCOM positive) is of course an undesirable control state where, as in the present branch of the flow chart, system voltage Vs already is in excess of the setpoint V1. Therefore, where a positive PFCOM exists at block 407, processing passes to steps represented by block 411 to decrement PFCOM. This is also consistent with the preferred operation to which output voltage is increased firstly via field current control and thereafter via phase control, where then it follows to firstly reduce output voltage by reducing any current leading phase separation which may exist and thereafter via field current control. Thereafter, the routine is exited.

Assuming that Vs exceeds V1 and PFCOM is not positive, then block 407 passes control to the steps represented by block 409 whereat the PWM signal FPWM is decremented to reduce the field current thereby reducing Vs. The routine is then exited.

A system voltage Vs not in excess of the setpoint V1 will result in the execution of steps represented by block 413 whereat a check of the PWM signal FPWM is performed. Where a calibrated maximum FPWM has not yet been reached, for example 100 percent duty cycle, block 415 is encountered whereat FPWM is incremented to increase the field current thereby increasing Vs. Additionally, the desired phase signal PFCOM is set to zero at block 415 which is consistent with the priority of output control being firstly field current adjustments and secondly phase adjustments. Also, setting PFCOM to zero at this point in the routine removes any torque reduction setting thereof as may have been established at block 403 during earlier control loops. The routine is then exited.

In the case where system voltage Vs is less than the setpoint V1 and the PWM signal FPWM is at its maximum value, phase control may be appropriate. This situation results in the execution of steps represented by blocks 417–425. Beginning with block 417, the system voltage is checked against a second setpoint voltage V2 of lesser magnitude than setpoint V1. The difference between the two setpoint voltages V1 and V2 represents a deadband wherein phase control will not be implemented to increase alternator output. For example, where Vs is not less than setpoint V2, block 421 is encountered whereat the desired phase signal PFCOM is checked. Where PFCOM is not positive and therefore no phase difference is being commanded, the routine maintains current settings by taking no action other than exiting. However, where PFCOM is positive and some degree of phase control is active, block 423 indicates the execution of steps decrementing PFCOM. Of course, if system voltage remains between V1 and V2 then PFCOM will eventually decrement to zero and thereafter remain.

After field current has been maximized and system voltage Vs is below the second setpoint V2, blocks 419 and 425 are encountered. If PFCOM has not yet reached a predetermined maximum value, then block 425 provides for the incrementing thereof to increase alternator output. A maximum PFCOM, once reached, results in the bypass of further increases thereof and exiting of the routine. The maximum amount of current lead with respect to voltage will vary from system to system; however, it has been the experience of the inventor that the limiting factor is likely to be accessory belt slip due to the substantially greater torques presented thereto by the alternator so controlled.

While the invention has been described in terms of a preferred embodiment, it is anticipated that various modifications and alternative embodiments will be apparent to those skilled in the art and thus the scope of the invention is intended to encompass such modifications and alternative embodiments in accord with the claims as follows.

The embodiments of the invention in which an exclusive property or privilege is claimed are defined as follows:

1. In an automotive electrical system having an alternator drivingly connected to a vehicle engine, said alternator having a polyphase output winding producing a polyphase output comprising a polyphase alternating voltage and corresponding polyphase alternating current, an apparatus for varying the output and torque of the alternator comprising:

a controlled bridge rectifier coupled to said polyphase output winding and having a pair of direct voltage output terminals, said controlled bridge rectifier comprising a plurality of controlled rectifier elements each controllable in accordance with a respective conduction signal applied thereto;

a conduction signal generator for generating a plurality of conduction signals corresponding in frequency and phase separation to said polyphase alternating voltage, said conduction signals being applied to said controlled rectifier elements for controlling the conduction thereof;

a phase controller for establishing and maintaining a desired phase relationship between said alternating current and said alternating voltage by controlling a conduction timing of said conduction signals, whereby output and torque increase when conduction timing is advanced and output and torque decrease when conduction timing is retarded.

2. An apparatus for varying the output and torque of the alternator as claimed in claim 1 wherein said phase controller comprises a phase locked loop effective to control the phase relationship between said alternating current and said alternating voltage to a desired phase relationship.

3. An apparatus for varying the output and torque of the alternator as claimed in claim 1 wherein said controlled rectifier elements comprise field effect transistors.

4. In an automotive electrical system having an alternator drivingly connected to a vehicle engine, said alternator having a polyphase output winding producing a polyphase output comprising a polyphase alternating voltage and corresponding polyphase alternating current, an apparatus for varying the output and torque of the alternator comprising:

a controlled bridge rectifier coupled to said polyphase output winding and having a pair of direct voltage output terminals, said controlled bridge rectifier comprising a plurality of controlled rectifier elements each controllable in accordance with a respective conduction signal applied thereto;

a conduction signal generator for generating a plurality of conduction signals corresponding in frequency and phase separation to said polyphase alternating voltage, said conduction signals being applied to said controlled rectifier elements for controlling the conduction thereof;

current sensor for sensing an alternating current in at least one phase winding of said polyphase output winding and producing a current phase signal therefrom;

voltage sensing means for sensing an alternating voltage in said at least one phase winding of said polyphase output winding and producing a voltage phase signal therefrom;

apparatus for comparing said current phase signal with said voltage phase signal in phase to generate a measured phase difference signal therefrom;

means for comparing said measured phase difference signal to a desired phase difference signal to generate an error signal;

means responsive to said error signal for adjusting the conduction timing of said conduction signals so as to control the measured phase difference signal to coincide with the desired phase difference signal.

5. In an automotive electrical system having an alternator drivingly connected to a vehicle engine, said alternator having a polyphase output winding for producing a polyphase output comprising a polyphase alternating voltage and corresponding polyphase alternating current, a method for varying the output and torque of the alternator comprising the steps:

generating a plurality of conduction signals corresponding in frequency and phase separation to said polyphase alternating voltage;

applying said conduction signals to controlled rectifier elements of a controlled bridge rectifier;

sensing an alternating current in at least one phase winding of said polyphase output winding;

sensing an alternating voltage in said at least one phase winding of said polyphase output winding;

comparing said alternating current with said sensed alternating voltage in phase to ascertain a phase difference therebetween;

comparing said ascertained phase difference to a desired phase difference to ascertain a phase deviation therefrom;

adjusting the conduction timing of said conduction signals so as to control the ascertained phase difference to the desired phase difference.

* * * * *